US010200320B2

(12) United States Patent
Contractor et al.

(10) Patent No.: US 10,200,320 B2
(45) Date of Patent: Feb. 5, 2019

(54) IMPORT CONTENT ITEMS FROM EMAIL

(71) Applicant: Dropbox, Inc., San Francisco, CA (US)

(72) Inventors: Darius Contractor, San Francisco, CA (US); Yuran Lu, San Francisco, CA (US); Karl Rieb, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 226 days.

(21) Appl. No.: 14/976,637

(22) Filed: Dec. 21, 2015

(65) Prior Publication Data
US 2017/0180285 A1   Jun. 22, 2017

(51) Int. Cl.
*H04L 12/58* (2006.01)

(52) U.S. Cl.
CPC .............. *H04L 51/08* (2013.01); *H04L 51/12* (2013.01)

(58) Field of Classification Search
None
See application file for complete search history.

(56) References Cited

U.S. PATENT DOCUMENTS

| | | | |
|---|---|---|---|
| 6,938,033 B1* | 8/2005 | Schutzer | G06Q 10/107 |
| 9,660,946 B2* | 5/2017 | Bauchot | H04L 51/08 |
| 2004/0064733 A1 | 4/2004 | Gong | |
| 2006/0240805 A1* | 10/2006 | Backholm | H04L 51/38 |
| | | | 455/412.1 |
| 2007/0016613 A1* | 1/2007 | Foresti | G06Q 10/107 |
| 2008/0147746 A1* | 6/2008 | Bauchot | H04L 51/08 |
| 2008/0201668 A1* | 8/2008 | Roy | H04L 51/22 |
| | | | 715/854 |
| 2012/0054285 A1* | 3/2012 | Garg | G06Q 10/107 |
| | | | 709/206 |
| 2012/0254332 A1* | 10/2012 | Irvin | H04L 51/08 |
| | | | 709/206 |
| 2015/0095430 A1 | 4/2015 | Kaushik et al. | |
| 2015/0169599 A1* | 6/2015 | Burnett | H04L 51/08 |
| | | | 707/662 |
| 2017/0230319 A1* | 8/2017 | Bauchot | H04L 51/08 |

OTHER PUBLICATIONS

Rick Broida, "Automatically save Gmail attachments to Dropbox or another cloud", PC World, Sep. 21, 2012. (Available online at http://www.pcworld.com/article/2010355/automatically-save-gmail-attachments-to-dropbox-or-another-cloud-service.html, retrieved on Nov. 24, 2015).

"Kloudless: Google Chrome browser extension and Microsoft Outlook plugin", Kloudless, Inc., Berkeley, CA, 2015. (Available online at https://developers.kloudless.com/products, retrieved on Nov. 24, 2015).

* cited by examiner

*Primary Examiner* — Brian Whipple
(74) *Attorney, Agent, or Firm* — Polsinelli PC (57) ABSTRACT

An example computer-implemented method to download and organize attachments from messages includes downloading a message attachment and related message metadata from a messaging database such as an email attachment. The example computer-implemented method can then include indexing the message attachment using the message metadata. The example method can then include identifying a year of receipt and a sender of the message and present the attachment in a collection organized by year of receipt and sender.

20 Claims, 7 Drawing Sheets

| | From | To | Date | Subject | Attachments |
|---|---|---|---|---|---|
| 400m | Me | Jessica | 7/1/2015 | Hawaii Trip | group.jpg; surfing.jpg |
| 400n | Jessica | Me | 7/2/2015 | Re: Hawaii Trip | sunset.jpg; dinner.jpg; bikes.mov |
| 400o | Jessica | Me; John | 7/2/2015 | Re: Hawaii Trip | addresses.xls |
| 400p | John | Me; Jessica | 7/4/2015 | Re: Re: Hawaii Trip | addresses.xls |
| 400q | Me | Jeremy | 7/4/2015 | Fwd: Re: Re: Hawaii Trip | receipt.pdf |

FIG. 5

IMPORT CONTENT ITEMS FROM EMAIL

BACKGROUND

Many people use messaging systems (such as email accounts) as their de-facto online storage solution. For example, they email themselves and friends copies of files, photos, etc. Such messaging systems, however, are ill equipped for content management and lack functionality that is provided by file viewing applications (such as thumbnail views and hierarchical browsing). When trying to find a certain content item that is an attachment, a user must first find its associated email in what could be an extensive list of emails spanning multiple days, weeks, months, or years. Users that depend on their email account for online storage can easily lose track of attachments or forget about them.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for downloading and automatically organizing attachments from messages.

In some embodiments a content management system can access a messaging database containing a plurality of messages where some of the plurality of messages contain attachments, and each of the messages are associated with message metadata specific to each message. The content management system can download the attachments and the message metadata specific to each message containing the attachments. For each attachment, the content management system can index the attachment with the message metadata specific to the message containing the message attachment, and can, for each attachment, identify within the message metadata specific to the message containing the message attachment, at least one of a year of receipt and a sender of the message containing the message attachment. The content management system can display at least one attachment from the downloaded attachments in a collection organized into a file system directory metaphor including a plurality of virtual folders, the plurality of virtual folders including virtual folders for at least one of year of receipt or sender.

In some embodiments, an example computer-implemented method can be performed by a content management system, which can down a message attachment and message metadata for a message, such as an email message, from a messaging database. The content management system can index the message attachment using the message metadata. For example the content management system can identify and index the attachment according to data such as a date, sender, subject, message conversation identifier, etc. found within the message. The content management system can use the indexed metadata to display the attachment in a collection organized into a file system directory metaphor including a plurality of virtual folders. The plurality of virtual folders can include virtual folders for a year of message receipt or sender. Using the method as described above and herein, the content management system can display attachments appearing using the file system directory metaphor, which is better suited to navigating and finding message attachments than searching a messaging database.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for downloading and automatically organizing attachments from a message database, such as an email database. Searching a message database for an attachment can be cumbersome, and often requires opening each message to determine if the sought after attachment is present. The disclosed technology places attachments in a message database into a collection organized in a file system directory metaphor including a plurality of virtual folders, which is better suited for searching for, and viewing attachments.

Figure 1:
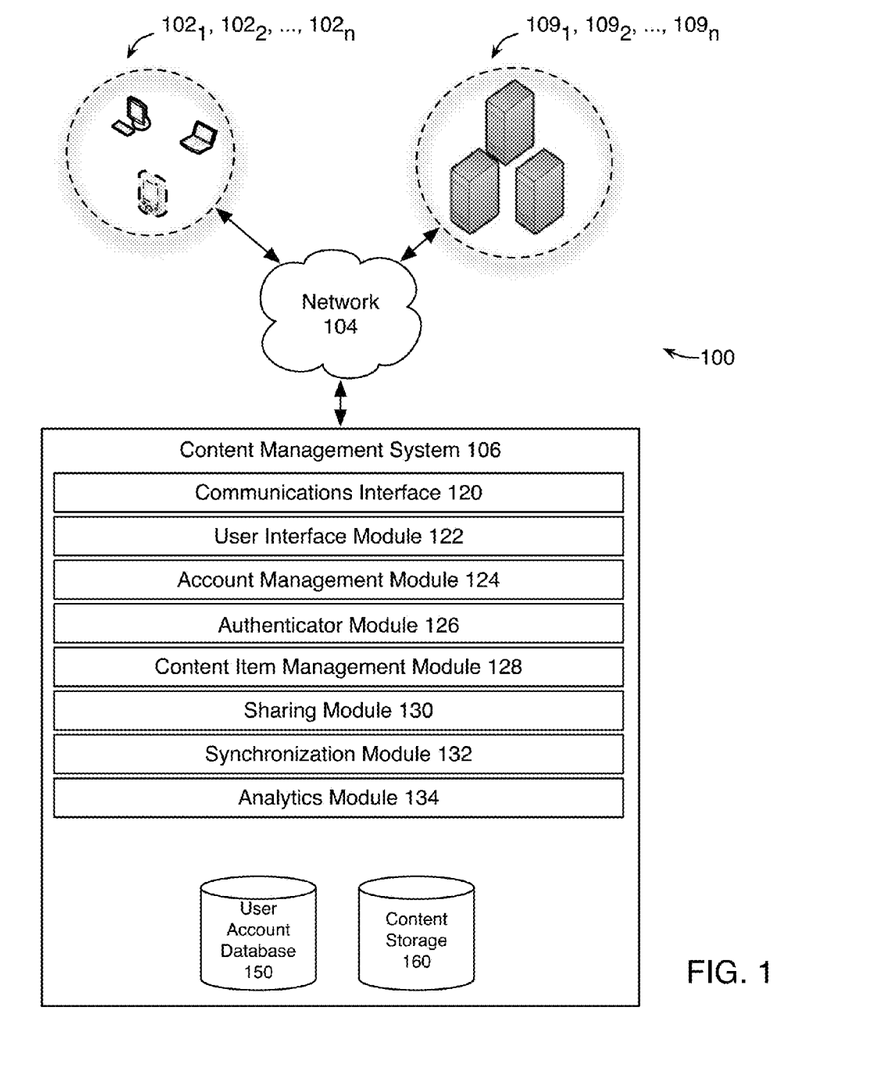
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2, \ldots, 102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device 102i can upload content to content management system 106 via network 104. Later, the same client device 102i or some other client device 102j can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device 102i. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102i can include client software, which synchronizes, via a synchronization module 132 at content management system 106, content in client device 102i's file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device 102*i* may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102 each with their own client software, can be associated with a single account and content items in the account can be synchronized between each of the multiple client devices 102.

Content management system 106 can include a communications interface 120 for interfacing with various client devices 102 and can interact with other content and/or service providers $109_1, 109_2, \ldots, 109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
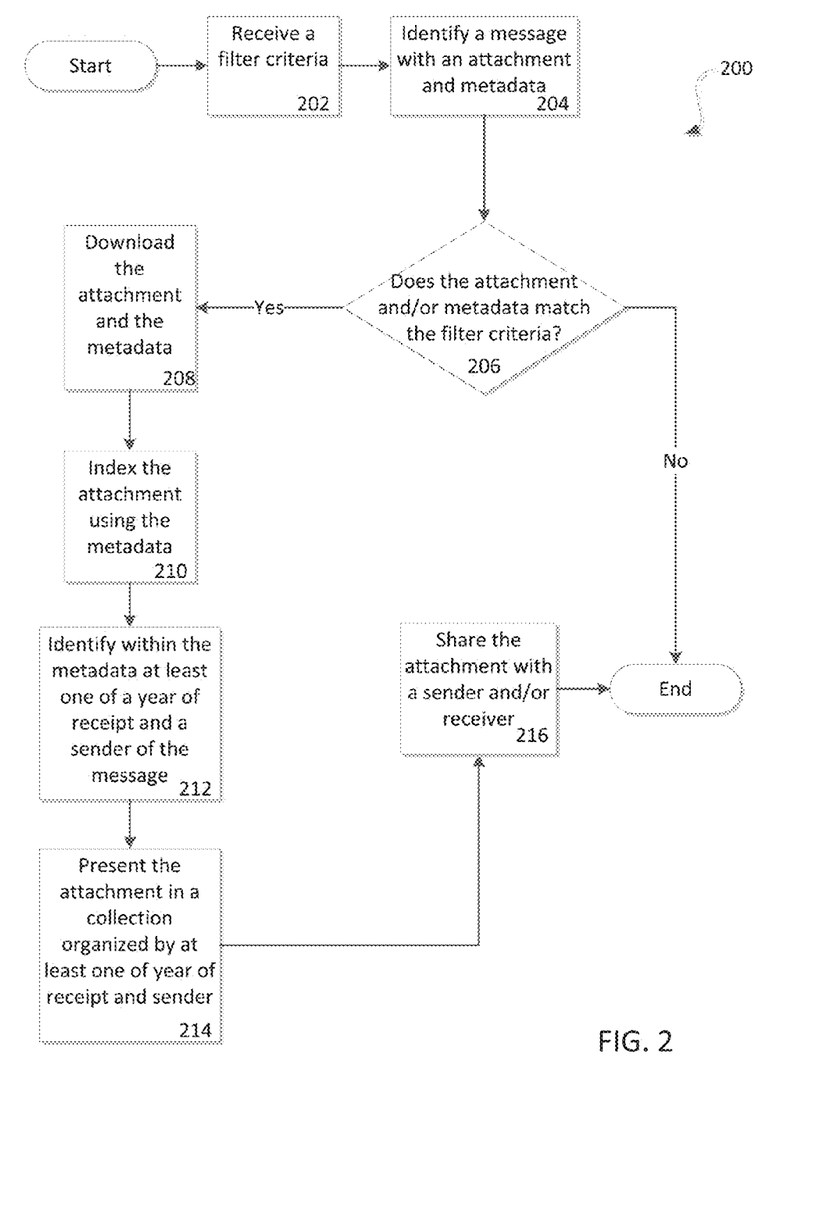
FIG. 2 shows an example process for importing email attachments according to various embodiments.

FIG. 2 shows an example process 200 for importing email attachments from an email message server into content management system 106 according to various embodiments. As illustrated in FIG. 1 email message server can one of service providers 109, for example email platform $109_n$. In some embodiments, content management system 106 performs process 200, but those ordinarily skilled in the art will appreciate that another entity, such as an email platform $109_n$ can perform process 200.

Process 200 can begin by receiving a filter criteria (step 202). The filter criteria can include any combination of a sender name, a sender address, a recipient name, a recipient address, a date and/or time of transmission, a date and/or time of receipt, an attachment size, an attachment type, an attachment metadata, a subject line, a search string, a collection of message participants, whether the message contains links to content items, a group associated with a sender or recipient, message metadata, etc. In some embodiments, the filter criteria can include user-provided criteria as well as criteria from other sources such as administrators, developers, the messaging platform, etc. The filter criteria described in step 202 can prevent content management system 106 from downloading and processing attachments of little interest or importance to the user. For example, a user might have ten gigabytes of attachments within their email system, but only 10% of the attachments are relevant, the rest being signature files, html formatting, certain file extensions, etc. This ingestion filter criteria can ensure that later steps in process 200 are more efficient by dealing with a smaller amount, and more relevant data.

Process 200 can continue by identifying a message with an attachment and metadata (step 204). In some embodiments, the message is an email, a text message, forum post, fax, mobile notification, instant message, etc. In some embodiments, content management system 106 can connect to a message provider (e.g., an email host, text message module, website, etc.) to access messages. An attachment can be an embedded content item (such as an email attachment or a content item that is otherwise included within the message) or a linked content item. A linked content item might be stored on a network location such as a website or cloud network. Message metadata can include a sender name, a sender address, a recipient name, a recipient address, a date and/or time of transmission, a date and/or time of receipt, message format, message flags or tags, associated folder (for messages that are arranged in a hierarchy), an account (for messages coming from a system managing multiple accounts, such as multiple email accounts), a storage location, a message size, header information, an indication of whether the message has been viewed, responded to, or forwarded, or anything else that describes the message.

Process 200 can then determine whether the attachment and/or metadata match the filter criteria (step 206). In some embodiments, the message can contain a message body (e.g., the text of the message, including formatting), a message metadata (e.g., sender address, recipient address, time of receipt, etc.), and attachment data. In addition to determining whether the attachment and/or metadata match the filter criteria, step 206 can include determining whether the message body matches the filter criteria (i.e., in some embodiments, the message body could be saved as a file and treated as an attachment).

If step 206 results in the affirmative, process 200 can then download the attachment and the metadata (step 208). In some embodiments, content management system 106 can download all of the metadata; alternatively, the system can download only a portion of the metadata. In addition to metadata, content management system 106 can download the message body.

Process 200 can then index the attachment and the metadata (step 210). Indexing can include organizing the metadata in a database and linking a database entry to the attachment. In this way, message metadata can become associated with the attachment. A future search of the index is not limited to the attachment itself, but can include extra information provided by the message metadata etc.

Process 200 can then identify, within the metadata, at least one of a year of receipt and a sender of the message (step 212). Process 200 can then present the attachment in a collection organized in a file system directory metaphor including a plurality of virtual folders (step 214). In some embodiments, the plurality of virtual folders be presented in several views such as a year view that can include virtual folders labeled with a year of receipt of the message containing the attachment, a sender view that can include virtual folders labeled with the sender of the message containing the attachment, a conversation view folder that can include virtual folders labeled with a subject of a conversation including multiple message that includes the message containing the attachment, etc. In some embodiments, only conversations that include a specified number of messages (e.g., three or more) can be sufficient to constitute a conversation.

In some embodiments, a collection can be a virtual folder or plurality of virtual folders according to a file system directory metaphor.

In some embodiments, step 212 includes grouping various senders based on predefined contact groups (e.g., supplied by the messaging platform) or contact groups that are determined through an analysis of messages. For example, if four contacts frequently intercommunicate but rarely include other contacts, content management system 106 can determine that they are a contact group. As well as a "sender of the message" step 212 can include contact groups.

As part of the presentation of the attachment, content management system 106 can receive search criteria, and only present attachments whose associated message metadata match the search criteria.

As noted above, content management system 106 can present attachments in several different views. In some embodiments, content management system 106 can cause one of client devices 102 to present selectable presentation options (e.g., view options) to a user of client device $102_n$. The selectable presentation options can include one or more of year view, sender view, and email thread view, etc. Content management system 106 can then receive a selection of one of the options and present the attachments in collections according to the selected option. For example, if "conversation" is selected, the attachments can be presented by conversation, as described later in FIG. 3B. This presentation can be on web interface provided by content management system 106 for viewing on client device $102_n$ or natively on client device $102_n$ where client device $102_n$ presents data downloaded from content management system 106. In embodiments wherein client device $102_n$ presents the data natively, this could be performed by a file viewing application on client device $102_n$ or by an application provided by content management system 106.

In embodiments wherein client device $102_n$ presents the data natively, client device $102_n$ can submit a search request to content management system 106 and content management system 106 can provide a collection organized accordingly. For example, content management system 106 can synchronize a collection with client device $102_n$ such that the collection contains the attachments that match the search criteria. In this manner, the synchronization logic on client device $102_n$ can be simpler—pushing the filtering logic to content management system 106.

Process 200 can then share the attachment with a sender and/or receiver (step 216). This can be accomplished by sharing a collection that contains the attachment though sharing module 130 of content management system 106. In some embodiments, sharing the attachment can include sending a message to the other participants—the message containing a link to the attachment. The sharing can also include changing the properties of the attachment or is parent collection to indicate that the attachment is shared with the other participants in the original message exchange. For example, if a group of friends had previously gone on a vacation together and had sent pictures from the trip to each other through email, content management system 106 can collect all of the pictures and store them on content management system 106. The participants could then receive a link to the location where the pictures are stored (and shared) and access them via content management system 106.

It should be understood that certain steps in example process 200 can be performed by a partner $209_1$. For example partner $209_1$ can connect to email partner $209_n$ and perform steps 202-208 and then connect to content management system 106 and upload the attachment for indexing and presentation according to steps 210-214. These connections can be established through application programming interface (API) calls.

FIGS. 3A-3F show various organization schemes for presentation views of attachments according to various embodiments consistent with the file system directory metaphor including the plurality of virtual folders. While it appears in FIGS. 3A-3F that attachments are stored within folders $301_{aa}$-$301_{fg}$, the files are not actually stored in a folder system, and are instead stored according in content management system's 106 content storage 160 as described above. Rather the file system directory metaphor including the plurality of virtual folders presents icons representing the attachments into virtual folders to give the impression that the attachments are stored in folders. Since the files are not actually stored in the folders, only one copy of each attachment need be stored in content storage 160, but an attachment could be represented under any of several virtual folders that apply. For example, a picture received in 2015, could be found under a virtual folder for all pictures, a virtual folder for all documents, a virtual folder for all attachments received in 2015, etc. As such the folders are virtual, in that they are not reflective of an actual storage directory structure, and rather are part of an organization scheme for organizing message attachments in a file system directory metaphor.

FIGS. 3A-3F contain examples of the organization and presentation of step 214. Folders $301_{aa}$-$301_{fg}$ can contain attachments such as attachments $302_{aa}$-$302_{bg}$. Folders $301_{aa}$, $301_{ba}$, $301_{ca}$, $301_{da}$, $301_{ea}$, and $301_{fa}$ can be a folder 301 created to contain all attachments that come from messages. It should be understood that the representations of folders 301 and content items herein can be metaphors for organizational structures according to various embodiments. Although FIGS. 3C-3F do not depict attachments 302, such omission is only to enhance the readability of the figures and does not imply that such folders 301 do not contain attachments 302.

Figure 3A:
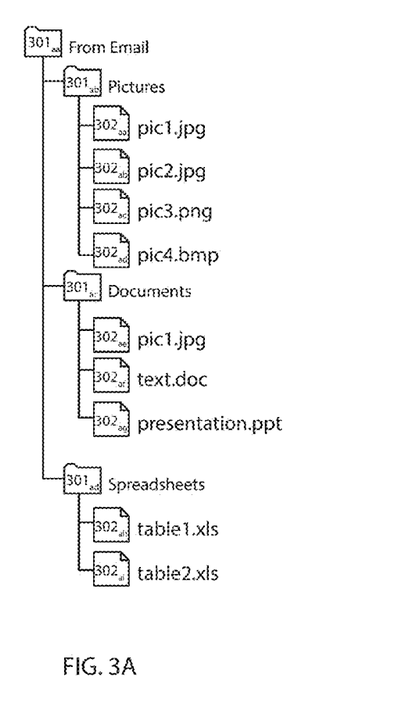
FIGS. 3A, 3B, 3C, 3D, 3E, and 3F show various organization schemes for presentation of attachments according to various embodiments.

As shown in FIG. 3A, attachments can be organized according to attachment type. For example, pictures (folder $301_{ab}$), documents (folder $301_{ac}$), and spreadsheets (folder $301_{ad}$). Other attachment types can include videos, music, audio, various file extensions (e.g., ".mov," ".mp3," ".doc," etc.), genre (e.g., fiction, non-fiction, horror, classics, etc.), etc.

Figure 3B:
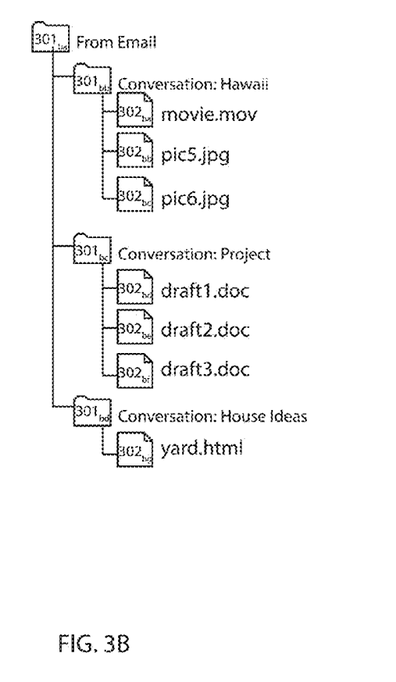

As shown in FIG. 3B, attachments can be organized according to conversations. For example, folder $301_{bb}$ can be for attachments related to a conversation about "Hawaii" while folder $301_{bc}$ can be for attachments related to a conversation about "Project" and folder $301_{bd}$ can be for attachments related to a conversation about "House Ideas." In some embodiments, these conversations are automatically detected and determined based on the messages and/or message metadata. For example, if one participant sends a message with the subject of the message being "Hawaii" and another participant send a message with the subject being "re: Hawaii" the system can conclude that those messages are part of a conversation about Hawaii. This can be useful for times when users send attachments between themselves such as exchanging pictures after a trip or exchanging attachments relevant to a single idea.

Figure 3C:
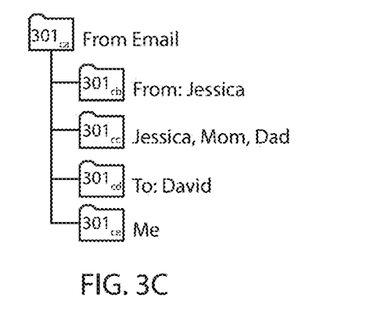

As shown in FIG. 3C, attachments can be organized according to participants. For example, folder $301_{cb}$ can include attachments from messages sent by Jessica while folder $301_{cc}$ can include attachments from messages where "Jessica", "Dad," or "Mom" were participants, folder $301_{cd}$ can include attachments from messages sent to "David" irrespective of the sender, and folder $301_{ce}$ can include attachments taken from messages where the account-holder is a participant ("Me"). The account-holder can be a user that has access to the messaging account being searched. In some embodiments, an account-holder might send an attachment to himself in order to store the attachment online, such attachments could go into folder $301_{ce}$.

Figure 3D:
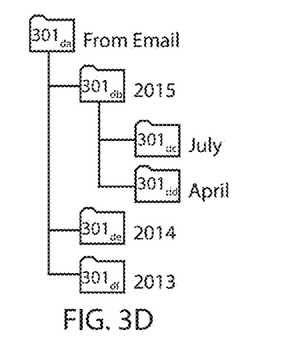

As shown in FIG. 3D, attachments can be organized according to year (e.g., folders $301_{db}$, $301_{de}$, and $301_{df}$) and then according to month (e.g., folders $301_{de}$ and $301_{dd}$). In some embodiments, attachments can be organized based on attachment metadata (e.g., the date that a picture attachment was captured) or message metadata (e.g., the date that the associated message was sent or received).

Figure 3E:
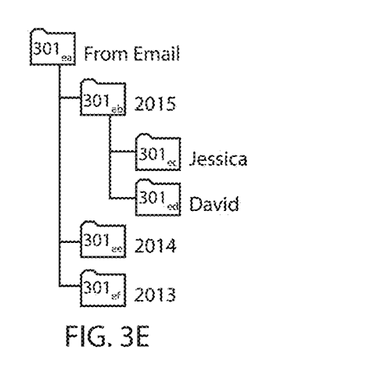

As shown in FIG. 3E, attachments can be organized according to multiple criteria; for example, attachments can be organized by year (e.g., folders $301_{eb}$, $301_{ee}$, and $301_{ef}$) then by participant (e.g., folders $301_{ec}$ and $301_{ed}$).

Figure 3F:
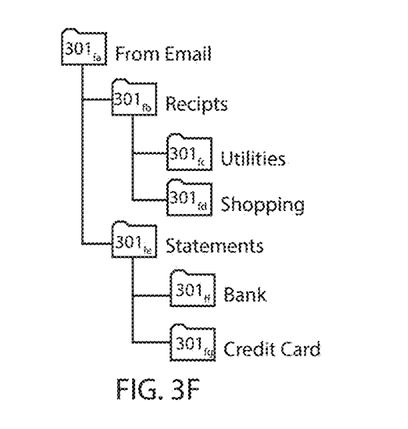

As shown in FIG. 3F, attachments can be organized according to categories (e.g., folders $301_{fb}$ and $301_{fe}$) and sub-categories (e.g., folder $301_{fc}$, $301_{fd}$, $301_{ff}$, and $301_{fg}$). In some embodiments, categories (and sub-categories) can be manually entered (e.g., a user can create a filter assigning attachments coming from messages from certain senders to a specified folder) or automatically (e.g., a system can automatically determine that an attachment fits a category or sub-category). In some embodiments, a system can go through an account-holder's messages and automatically download receipts, statements, bills, notices, invoices, promotions, coupons, shipping labels, event tickets, or other documents that the account-holder might want to have for archival purposes.

Figure 4A:
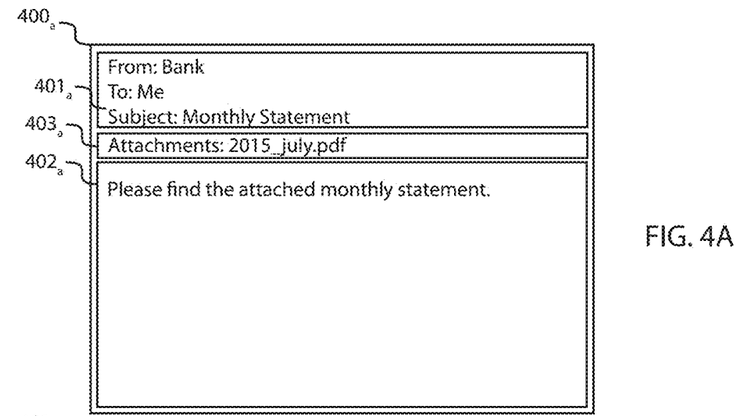
FIGS. 4A, 4B, and 4C show various example electronic messages according to various embodiments.
Figure 4B:
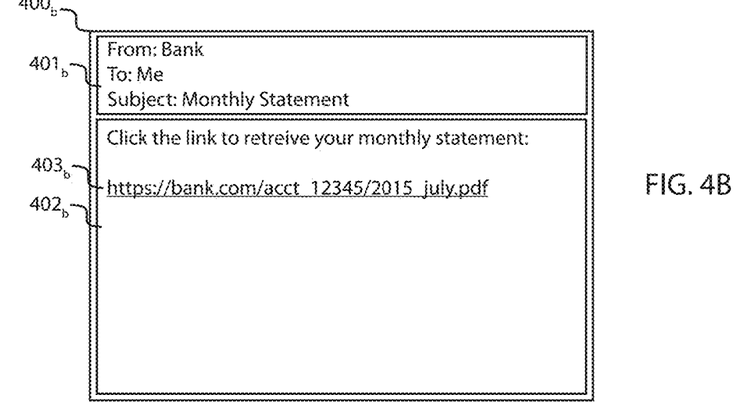
Figure 4C:
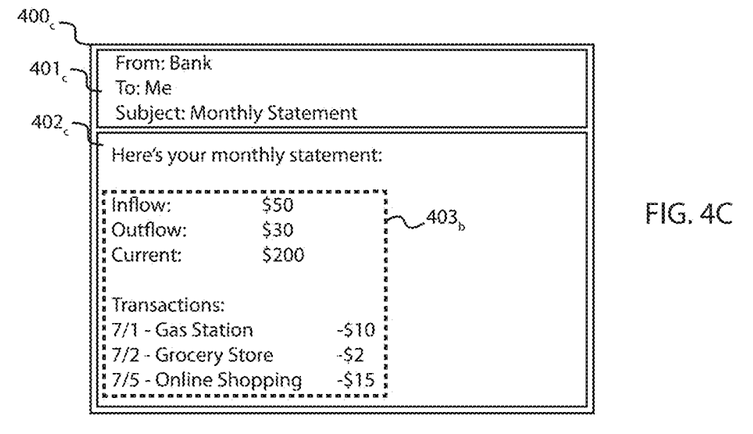

FIGS. 4A-4C show various example electronic messages $400_a$-$400_c$ (collectively, "electronic message 400") containing respective headers $401_a$-$401_c$ (collectively, "header 401"), respective message bodies $402_a$-$402_c$ (collectively, "message body 402"), and respective attachments $403_a$-$403_c$ (collectively, "attachment 403"). Electronic message 400 can be an email, text message (e.g., SMS or MMS), instant message, forum post, fax, etc. Header 401 can include sender name, sender address, send time and date, return address, recipient name, recipient address, authentication details (e.g., a domain signature), and subject. Message metadata can include header 401. Address (sender and/or recipient) can include MAC address, IP address, email address, phone number, screen name, etc. Message body 402 can contain text, multimedia, etc. formatted in rich text, html, etc. FIG. 4A shows message $400_a$ that contains attachment $403_a$ according to various embodiments. Attachment 403 can be a content item or a folder of content items.

As in FIG. 4A, attachment $403_a$ can be a content item ("2015_july.pdf") contained with message $400_a$ and identified by the message as an attachment. In some embodiments, such as shown in FIG. 4B, the data of attachment $403_b$ is not contained within the message, however, the data of attachment $403_b$ can be retrieved by visiting a link and downloading the data from a network location. In some embodiments, the link is for a bank statement and directs the browser to a bank account that requires login credentials. In some such embodiments, a user could provide login credentials at an earlier time allowing content management system 106 to log in and download the linked item. In some embodiments, limited login credentials can be provided that only provide access to the statement. Because banks and similar institutions typically do not maintain records after a period of time, this principle can be useful for archiving statements beyond the period that the bank keeps them.

Similar to banks, other institutions such as utility companies, credit card issuers, loan facilitators, loyalty clubs, etc. send receipts and statements. Content management system 106 can similarly activate a link in an email and download the receipts and statements. Upon downloading the receipts and statements, content management system 106 present them in a folder according to their associated institution. This can serve as an archive of important documents for a user.

In some embodiments, the email does not contain the attachment nor does it link to the attachment, instead it can merely inform the user that a new document (statement, receipt, etc.) is available. Content management system can then go to the relevant portion of the website and download the new document.

In some embodiments, it can be desirable to create a customized folder associated with rules for organizing message attachments. While the present technology as described above largely allows a user to search their email attachments and view them in a file system metaphor, it can be useful to persistently save search criteria and have all attachments matching that search criteria be reflected in a customized folder. For instance, using the example of the bank statement having a bank statement $403_a$ attached to the email $400_a$ a customized folder could be associated with a rule that specifies a sender (the bank) and/or a portion of the subject $401a$ ("statement") to proactively show all bank statements in the customized folder that would persist and always be viewable in the file system metaphor view. This is another mechanism by which an archive of selected attachments could be created.

In some embodiments, as shown in FIG. 4C, attachment $403_b$ can be contained within message body $402_c$. In some such embodiments, downloading the attachment (as set forth in step 208) can include saving the relevant portion of message body $402_c$ as a picture, pdf, text file, html page, etc. In some embodiments, the relevant portion of message body $402_c$ is the entirety of message body $402_c$.

Figure 5:
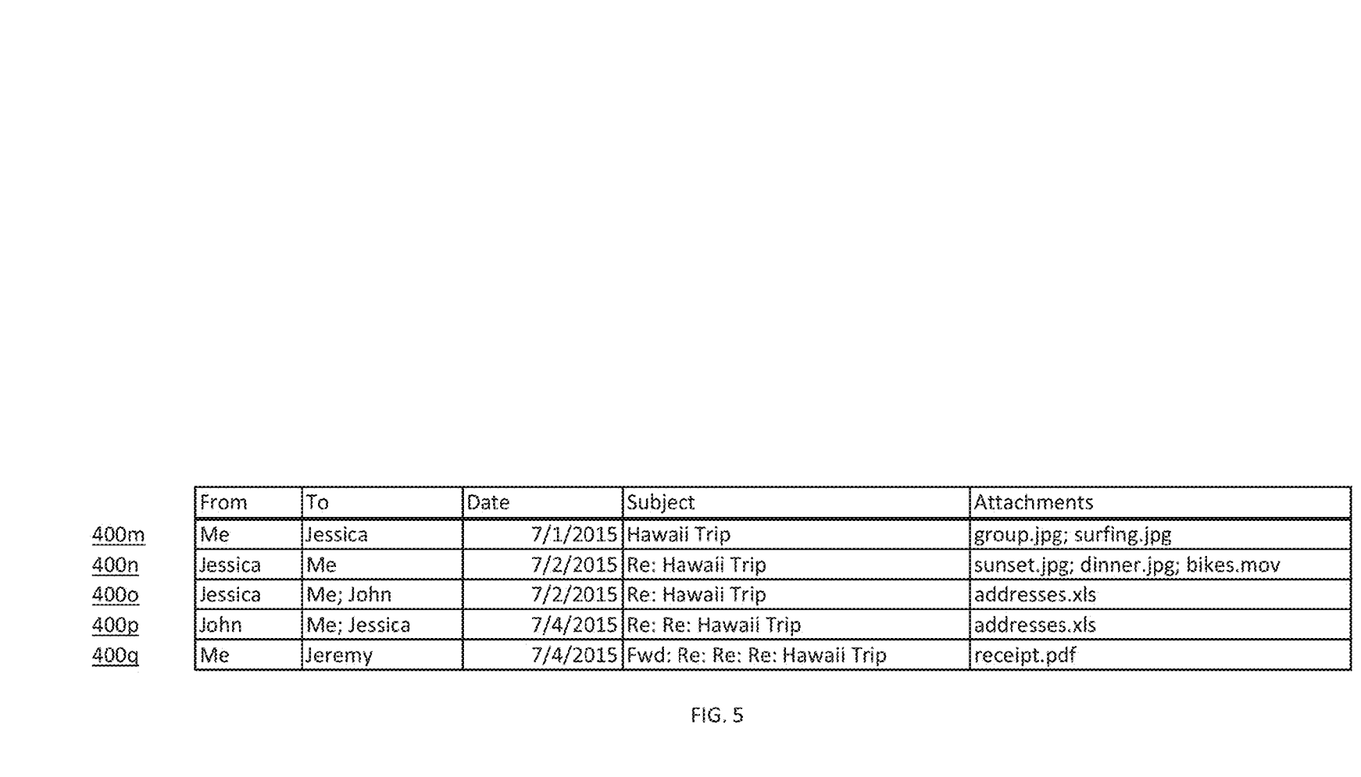
FIG. 5 shows a list of various example electronic messages according to various embodiments.

FIG. 5 shows various example messages $400_m$-$400_q$ and associated attachments according to various embodiments. In some embodiments, content management system 106 can detect that certain messages are in the same conversation which can guide organization of the attachments into folders such as folders $301_{bb}$-$301_{bd}$ in FIG. 3B. For example, aside from "RE:" and "FWD:" prefixes, messages $400_m$-$400_q$ all have the same subject ("Hawaii Trip"). This subject can be the label for a folder that will contain the associated attachments (e.g., "group.jpg," "surfing.jpg," "sunset.jpg," "dinner.jpg," "bikes.mov," and "addresses.xls"). In some embodiments, each message in a conversation must have the exact same participants (e.g., "Me" and "Jessica" in messages $400_m$ and $400_n$) Alternatively, every message with the same subject can be a member of the conversation, irrespective of whether the participants are exactly the same (e.g., messages $400_m$-$400_q$). Sometimes, a single content item is sent back and forth amongst message participants, such as "addresses.xls" in messages $400_o$ and $400_p$. Content management system 106 can determine if the later attachment is an updated version of prior version(s) and only keep the most up-to-date version. Alternatively, each version can be downloaded and retained with a different filename. For example, "addresses.xls" from message $400_o$ can be renamed to "addresses_1.xls" while the similar attachment form message $400_p$ can be renamed to "addresses_2.xls."

Content management system 106 can, after saving the attachments in a folder, share the folder with the participants of the conversation. For example, the conversation in FIG. 5 can be shared with Jessica, John, and Jeremy. In some embodiments, the user account (e.g., of "Me" in FIG. 5) is not the same as the user's account on content management system 106. This might occur if a user uses a primary email account for correspondence with friends (e.g., message $400_m$) but a secondary email account for registering for content management system 106. If a second user (e.g., "Jessica" in message $400_n$) shares a file with the primary account, the shared file might be an unauthenticated link to content management system 106. An unauthenticated link means the link does not require a user to sign in to the system using an account (e.g., secondary account). In such a circumstance, when content management system 106 determines that the attachment was sent to the primary account as a shared content item. It can then modify the sharing permissions of the content item to be shared with the user's secondary account—the one that is registered with content management system 106.

Figure 6A:
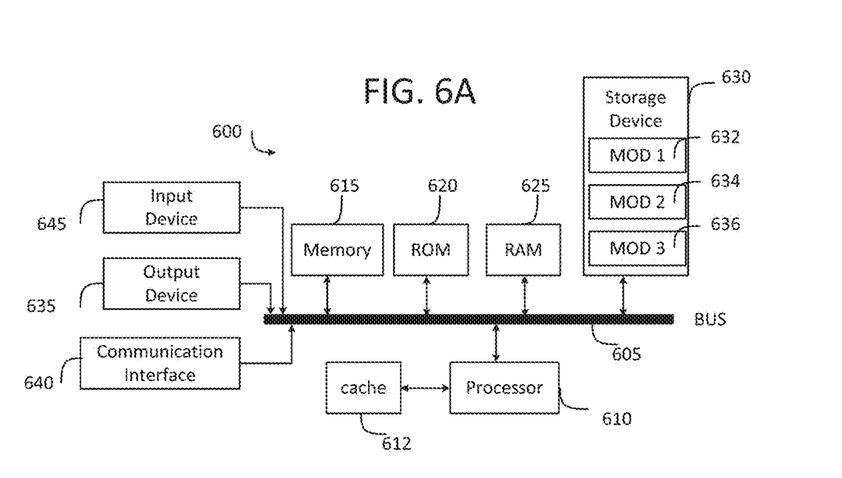
FIG. 6A shows an example possible system embodiment for implementing various embodiments of the present technology.
Figure 6B:
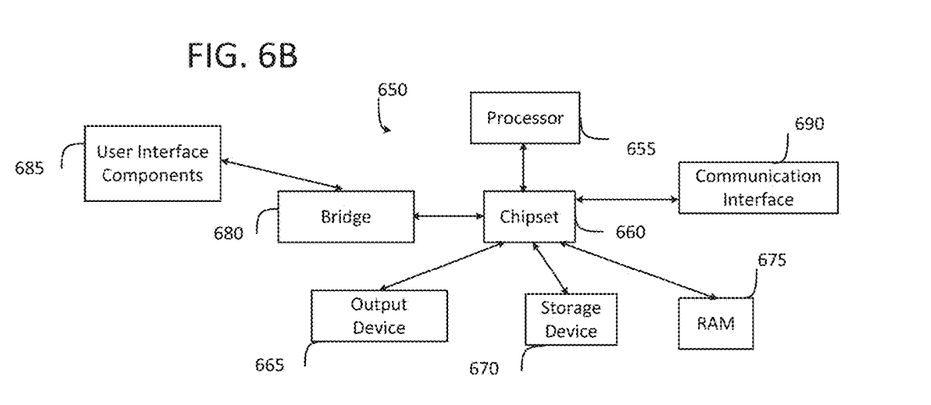
FIG. 6B shows an example possible system embodiment for implementing various embodiments of the present technology.

6A and FIG. 6B show example possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer-readable medium comprising:
    computer executable instructions stored thereon, wherein the instructions when executed by one or more processors, cause a content management system to:
        connect to an external electronic messaging system hosting a plurality of electronic messages communicated via the external electronic messaging system;
        identify a plurality of attachments in electronic messages on a messaging account of the external electronic messaging system;
        import, from the external electronic messaging system, to a user account on the content management system, a set of the plurality of attachments and respective message metadata associated with a respective set of the electronic messages, the set of the plurality of attachments excluding one or more attachments from the plurality of attachments filtered based on at least one filtering criterion defined for importing attachments from the external electronic messaging system, wherein the user account on the content management system is separate from the messaging account on the external electronic messaging system;
        for each attachment imported, add an index entry for the attachment in an index of attachments on the content management system, the index entry comprising the respective message metadata specific to a respective electronic message containing the attachment;
        based on the respective message metadata in the index entry for each attachment, identify a respective attribute of each respective electronic message containing the attachment;
        organize the set of the plurality of attachments into a set of collections, wherein each attachment is organized into a respective collection corresponding to the respective attribute of the respective electronic message containing the attachment; and
        display a file system directory metaphor including a plurality of virtual folders representing the set of collections, the file system directory metaphor depicting a directory structure view that is different from an actual storage structure associated with the plurality of attachments.

2. The non-transitory computer-readable medium of claim 1, further comprising instructions that, when executed by the one or more processors cause the content management system to:
    receive search criteria;
    search the message metadata in the index for matches to the search criteria; and
    present, in the file system directory metaphor, at least one attachment from the set of the plurality of attachments when the respective message metadata specific to the electronic message containing the at least one attachment matches the search criteria.

3. The non-transitory computer-readable medium of claim 1, further comprising instructions that, when executed by the one or more processors cause the content management system to:
    display viewing options for the file system directory metaphor including selectable options for a year view, sender view, and email thread view;
    receive a selection of one of the selectable options;
    organize the set of the plurality of attachments into the set of collections based on the selection of one of the selectable options, wherein the respective attribute pertains to a view option associated with the selection of one of the selectable options; and
    display the file system directory metaphor with the plurality of virtual folders representing the set of collections based on the selected one of the selectable options.

4. The non-transitory computer-readable medium of claim 1, wherein the identifying and importing comprises:
    identifying a link in a body of an electronic message on the messaging account, the link identifying a network path associated with a content item;
    downloading the content item from the network path identified by the link; and
    importing the content item downloaded from the network path into the user account on the content management system.

5. The non-transitory computer-readable medium of claim 1, wherein the importing comprises:
    setting a filter including the at least one filtering criterion for importing attachments from the external electronic messaging system; and
    downloading and importing to the user account on the content management system only attachments and respective message metadata corresponding to electronic messages on the messaging account that match the at least one filtering criterion.

6. The non-transitory computer-readable medium of claim 5, wherein the at least one filtering criterion is a minimum attachment size such that only those attachments having a size greater than the minimum attachment size are downloaded and imported to the user account on the content management system.

7. The non-transitory computer-readable medium of claim 5, wherein the at least one filtering criterion is a file type such that only those attachments matching the file type are downloaded and imported to the user account on the content management system.

8. A content management system comprising:
one or more processors;
at least one computer-readable medium; and
non-transitory computer-readable instructions stored on the at least one computer-readable medium that, when executed by the one or more processors, cause the content management system to:
access a messaging account on an external electronic messaging system, the messaging account comprising a plurality of electronic messages communicated via the external electronic messaging system;
search the plurality of electronic messages for attachments in the plurality of electronic messages;
identify a plurality of attachments in a respective set of electronic messages from the plurality of electronic messages;
download and import, from the external electronic messaging system, to a user account on the content management system, a set of the plurality of attachments and respective message metadata associated with respective electronic messages associated with the set of the plurality of attachments, the set of the plurality of attachments excluding one or more attachments from the plurality of attachments filtered based on at least one filtering criterion defined for importing attachments from the external electronic messaging system, wherein the user account on the content management system is separate from the messaging account on the external electronic messaging system;
index, by the content management system, each of the set of the plurality of attachments in an index of attachments using the respective message metadata;
identify, within the respective message metadata in the index of attachments, a respective attribute of each respective electronic message, the respective attribute comprising at least one of a message year or a message addressee;
organize the set of the plurality of attachments into a set of collections, wherein each attachment is organized into a respective collection corresponding to the respective attribute of the respective electronic message containing the attachment; and
display a file system directory metaphor including a plurality of virtual folders representing the set of collections, the file system directory metaphor depicting a directory structure view based on an organization of the set of collections, the organization being different from an actual organization of the set of the plurality of attachments on storage.

9. The content management system of claim 8, wherein the non-transitory computer-readable instructions, when executed by the one or more processors, further cause the content management system to:
receive search criteria;
search the index for the search criteria; and
present one or more attachments associated with respective message metadata matching the search criteria.

10. The content management system of claim 8, wherein the non-transitory computer-readable instructions, when executed by the one or more processors, further cause the content management system to:
display viewing options including selectable options for a year view, sender view, and email thread view;
receive a viewing option selected from the selectable options;
organize the set of the plurality of attachments into the set of collections based on the viewing option, wherein the respective attribute pertains to the viewing option; and
display the file system directory metaphor with the plurality of virtual folders representing the set of collections according to the viewing option.

11. The content management system of claim 8, wherein two or more of the virtual folders comprise a virtual attachment corresponding to a same attachment on storage.

12. The content management system of claim 8, wherein the non-transitory computer-readable instructions, when executed by the one or more processors, further cause the content management system to:
identify a link in a body of an electronic message on the messaging account, the link identifying a network path associated with a content item;
download the content item from the network path identified by the link; and
import the content item downloaded from the network path into the user account on the content management system.

13. The content management system of claim 8, wherein the non-transitory computer-readable instructions, when executed by the one or more processors, further cause the content management system to:
filter attachments matching the at least one filtering criterion, wherein the at least one filtering criterion comprises at least one of a minimum attachment size or a file type; and
download and import only those attachments and respective message metadata matching the at least one filtering criterion.

14. The content management system of claim 8, wherein the non-transitory computer-readable instructions, when executed by the one or more processors, further cause the content management system to:
based on the respective message metadata, identify addressees of one or more respective electronic messages containing one or more respective attachments; and
share a virtual folder in the plurality of virtual folders with two or more user accounts on the content management system, the two or more user accounts being associated with the addressees.

15. A method comprising:
connecting, by a content management system, to an external electronic messaging system hosting a plurality of electronic messages communicated via the external electronic messaging system;
identifying, by the content management system, a plurality of attachments in a respective set of electronic messages on a messaging account of the external electronic messaging system;
downloading and importing, from the external electronic messaging system, to a user account on the content management system, a set of the plurality of attachments and respective message metadata associated with the respective electronic messages associated with the set of the plurality of attachments, the set of the plurality of attachments excluding one or more attachments from the plurality of attachments filtered based on at least one filtering criterion defined for importing attachments from the external electronic messaging system, wherein the user account on the content management system is separate from the messaging account on the external electronic messaging system;

indexing, by the content management system, the set of the plurality of attachments in an index of attachments using the respective message metadata, each attachment being associated with a respective index entry;

based on the index, identifying, within the metadata, respective attributes of the respective electronic messages;

organizing the set of the plurality of attachments into a set of collections, wherein each attachment is organized into a respective collection corresponding to a respective attribute of a respective electronic message associated with the attachment; and generating a file system directory metaphor including a plurality of virtual folders representing the set of collections, the file system directory metaphor depicting a directory structure view that is separate from an actual storage organization of the set of the plurality of attachments on the content management system.

16. The method of claim 15, further comprising:
receiving search criteria by the content management system;
searching the index for the search criteria; and
presenting one or more attachments associated with respective message metadata that match the search criteria.

17. The method of claim 15, further comprising:
display viewing options including selectable options for year view, sender view, and email thread view;
identify a viewing option based on a selection of one of the selectable options; and
display the file system directory metaphor with the plurality of virtual folders representing the set of collections according to the viewing option.

18. The method of claim 15, wherein organizing the set of the plurality of attachments and generating the file system directory metaphor comprises:
identifying a link in a body of an electronic message on the messaging account, the link identifying a network path associated with a content item;
downloading the content item from the network path identified by the link; and
importing the content item downloaded from the network path into the user account on the content management system.

19. The method of 15, wherein the downloading and importing comprises:
filtering the one or more attachments matching the at least one filtering criterion, wherein the at least one filtering criterion comprises an attachment size or a type of attachment; and
downloading only those attachments and respective message metadata that match the at least one filtering criterion.

20. The method of claim 19, wherein two or more of the plurality of virtual folders comprise a virtual attachment corresponding to a same attachment on storage, the virtual attachment being associated with two or more of the set of collections, and wherein at least one of the plurality of virtual folders comprises a folder shared between two or more user accounts on the content management system.

* * * * *

UNITED STATES PATENT AND TRADEMARK OFFICE
CERTIFICATE OF CORRECTION

PATENT NO. : 10,200,320 B2
APPLICATION NO. : 14/976637
DATED : February 5, 2019
INVENTOR(S) : Darius Contractor, Yuran Lu and Karl Rieb Page 1 of 1

It is certified that error appears in the above-identified patent and that said Letters Patent is hereby corrected as shown below:

In the Claims

Column 16, Lines 55-64 Claim 5 reads:
5. The non-transitory computer-readable medium of claim 1, wherein the importing comprises: setting a filter including the at least one filtering criterion for importing attachments from the external electronic messaging system; and downloading and importing to the user account on the content management system only attachments and respective message metadata corresponding to electronic messages on the messaging account that match the at least one filtering criterion.

Should read:
5. The non-transitory computer-readable medium of claim 1, wherein the importing comprises further comprising instructions that, when executed by one of more processors cause the content management system to:
setting a filter including the at least one filtering criterion for importing attachments from the external electronic messaging system; and
downloading and importing to the user account on the content management system only attachments and respective message metadata corresponding to electronic messages on the messaging account that match the at least one filtering criterion.

Signed and Sealed this
Fourteenth Day of April, 2020

Andrei Iancu
*Director of the United States Patent and Trademark Office*